United States Patent
Dyer

(10) Patent No.: US 10,377,584 B1
(45) Date of Patent: Aug. 13, 2019

(54) RETAINING SYSTEM FOR VERTICALLY STACKED MATERIAL

(71) Applicant: Steven J. Dyer, Cornelius, NC (US)

(72) Inventor: Steven J. Dyer, Cornelius, NC (US)

( * ) Notice: Subject to any disclaimer, the term of this patent is extended or adjusted under 35 U.S.C. 154(b) by 0 days.

(21) Appl. No.: 16/234,050

(22) Filed: Dec. 27, 2018

Related U.S. Application Data

(60) Provisional application No. 62/613,585, filed on Jan. 4, 2018.

(51) Int. Cl.
*B65G 57/00* (2006.01)
*F16B 2/22* (2006.01)

(52) U.S. Cl.
CPC ............... *B65G 57/00* (2013.01); *F16B 2/22* (2013.01)

(58) Field of Classification Search
CPC .......... B65G 57/00; F16B 2/22; A47F 7/0042; E04F 21/00; F16M 13/02; F16M 11/048; E04G 5/00; Y10T 24/3499
See application file for complete search history.

(56) References Cited

U.S. PATENT DOCUMENTS

| | | | | |
|---|---|---|---|---|
| 413,071 | A * | 10/1889 | Lowe | A47C 21/022 24/72.5 |
| 1,195,874 | A * | 8/1916 | Thurston | A47C 21/022 24/507 |
| 2,103,244 | A * | 12/1937 | Briscoe | A47C 21/022 24/265 R |
| 2,256,107 | A * | 9/1941 | Zadek | B62B 9/108 220/DIG. 3 |
| 2,609,761 | A | 9/1952 | Clark | |
| 2,857,643 | A * | 10/1958 | Tomsic | A47G 9/0246 24/301 |
| D308,627 | S | 6/1990 | Guffey | |
| 5,120,072 | A * | 6/1992 | Laramie | B62B 3/108 280/47.17 |
| 5,161,762 | A * | 11/1992 | Stewart | B60P 7/10 211/43 |
| 5,163,695 | A * | 11/1992 | Pakowsky | B62B 3/108 248/434 |
| 5,983,573 | A | 11/1999 | MacKarvich | |
| 6,293,058 | B1 | 9/2001 | Sink | |
| 6,758,448 | B1 * | 7/2004 | Williams | A47B 96/02 248/125.1 |
| 6,957,515 | B1 * | 10/2005 | Hatfield | E04F 21/18 248/354.3 |
| 7,543,789 | B2 | 6/2009 | Lindberg | |
| 7,549,828 | B2 | 6/2009 | Smith | |

(Continued)

*Primary Examiner* — Ko H Chan
(74) *Attorney, Agent, or Firm* — Kyle A. Fletcher, Esq.

(57) ABSTRACT

The retaining system for vertically stacked material is configured for use with a plurality of drywall sheets that are awaiting installation. The retaining system for vertically stacked material is a fastening device that secures the plurality of drywall sheets to a stanchion such that the plurality of drywall sheets will not fall during storage. The retaining system for vertically stacked material comprises a stanchion clip, a drywall clip, a securing strap, and a locating beacon. The stanchion clip attaches to the stanchion. The drywall clip attaches to a drywall sheet selected from the plurality of drywall sheets. The securing strap attaches the drywall clip to the stanchion clip. The locating beacon is a GPS based device that identifies the location and of the retaining system for vertically stacked material.

16 Claims, 4 Drawing Sheets

(56) References Cited

U.S. PATENT DOCUMENTS

| | | |
|---|---|---|
| 7,997,839 B1 | 8/2011 | Gallegos |
| 8,544,804 B2 | 10/2013 | Schouten |
| 2011/0180675 A1 | 7/2011 | Schouten |
| 2017/0127810 A1* | 5/2017 | King .................. H04N 1/00901 |

* cited by examiner

RETAINING SYSTEM FOR VERTICALLY STACKED MATERIAL

CROSS REFERENCES TO RELATED APPLICATIONS

This non-provisional application claims priority under 35 USC 119(e) to United States provisional application US 62/613,585 filed on Jan. 4, 2018 by the inventor: Mr. Steven J Dyer.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fixed construction and building, more specifically, a device for storing a stack of sheeted material against a wall or vertical surface. (E04G5/03)

SUMMARY OF INVENTION

The retaining system for vertically stacked material is configured for use with a plurality of drywall sheets that are awaiting installation. The retaining system for vertically stacked material is a fastening device that secures the plurality of drywall sheets to a stanchion such that the plurality of drywall sheets will not fall during storage. The retaining system for vertically stacked material comprises a stanchion clip, a drywall clip, a securing strap, and a locating beacon. The stanchion clip attaches to the stanchion. The drywall clip attaches to a drywall sheet selected from the plurality of drywall sheets. The securing strap attaches the drywall clip to the stanchion clip. The locating beacon is a GPS based device that identifies the location of the retaining system for vertically stacked material.

These together with additional objects, features and advantages of the retaining system for vertically stacked material will be readily apparent to those of ordinary skill in the art upon reading the following detailed description of the presently preferred, but nonetheless illustrative, embodiments when taken in conjunction with the accompanying drawings.

In this respect, before explaining the current embodiments of the retaining system for vertically stacked material in detail, it is to be understood that the retaining system for vertically stacked material is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the retaining system for vertically stacked material.

It is therefore important that the claims be regarded as including such equivalent construction insofar as they do not depart from the spirit and scope of the retaining system for vertically stacked material. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
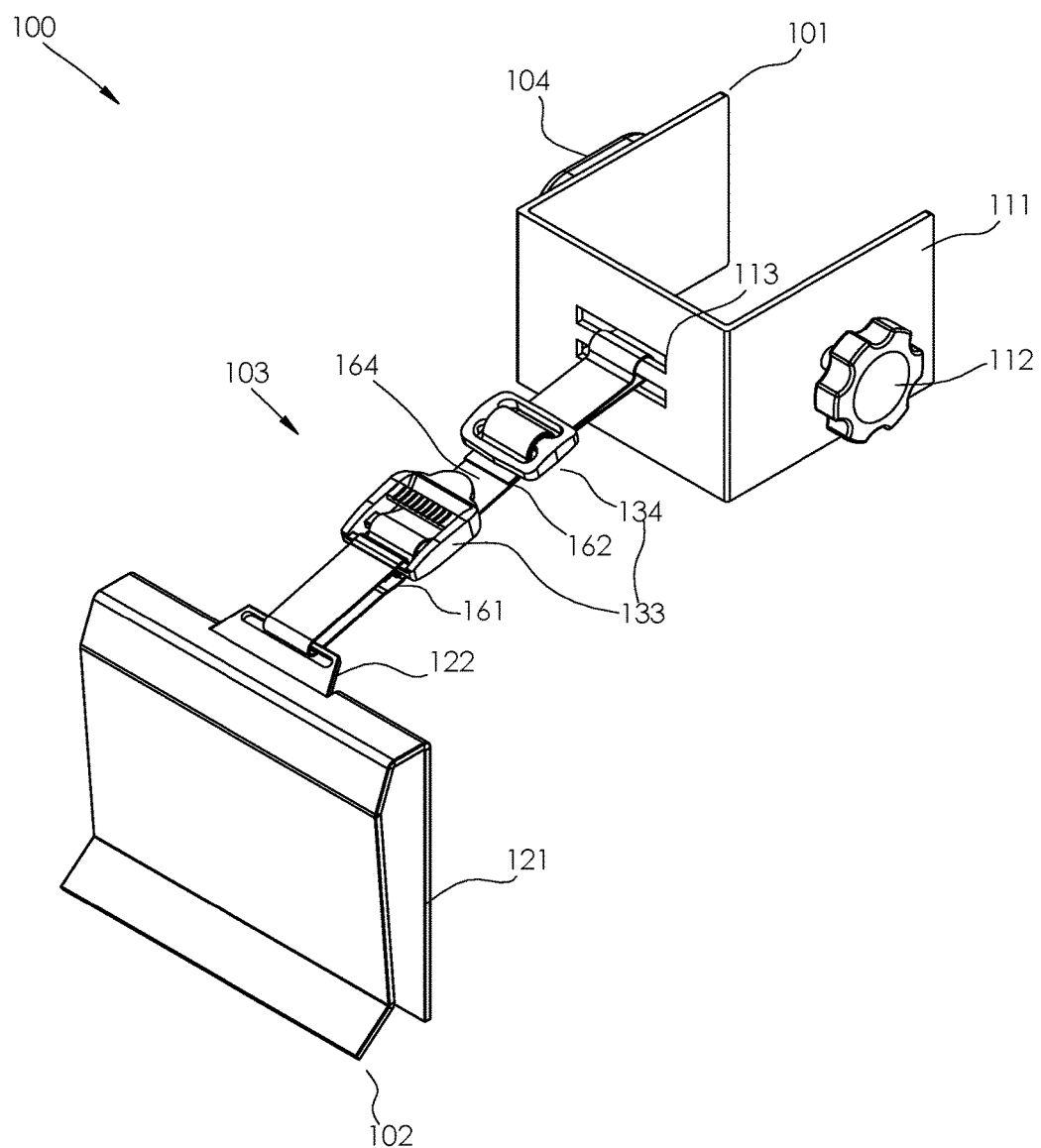
FIG. 1 a perspective view of an embodiment of the disclosure.
Figure 2:
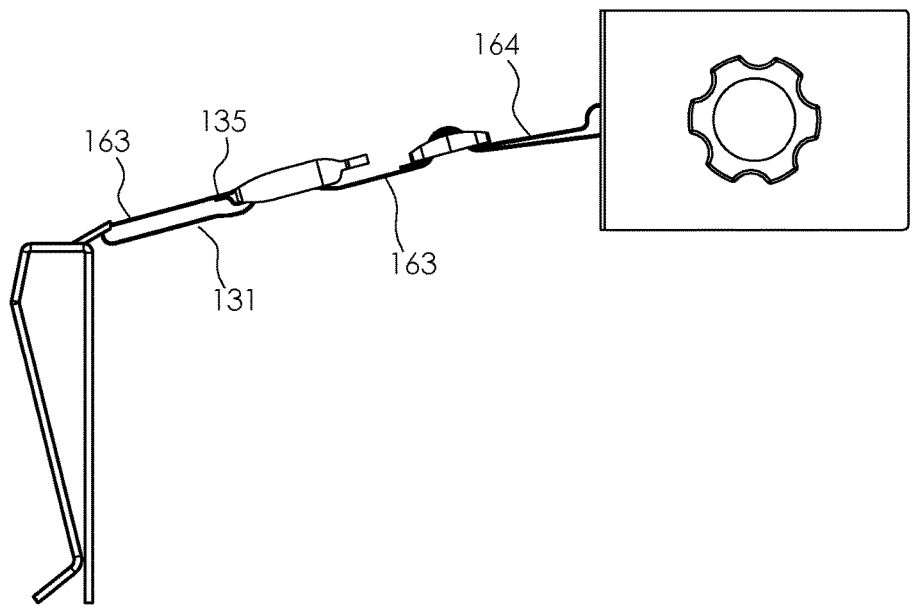
FIG. 2 a side view of an embodiment of the disclosure.
Figure 3:
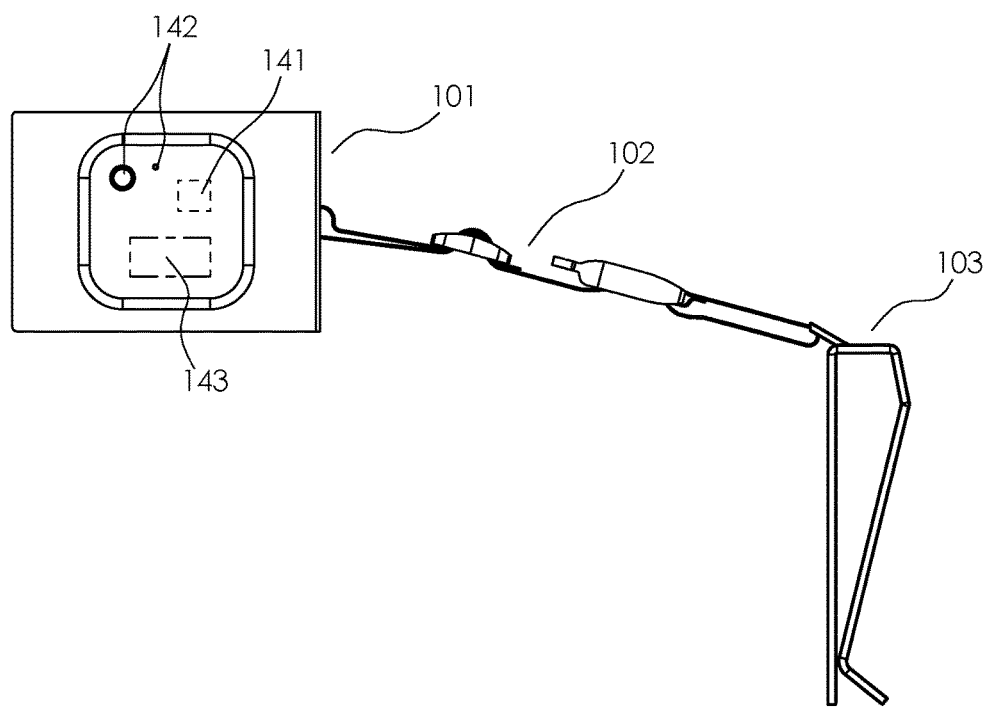
FIG. 3 an opposite side view of an embodiment of the disclosure.
Figure 5:
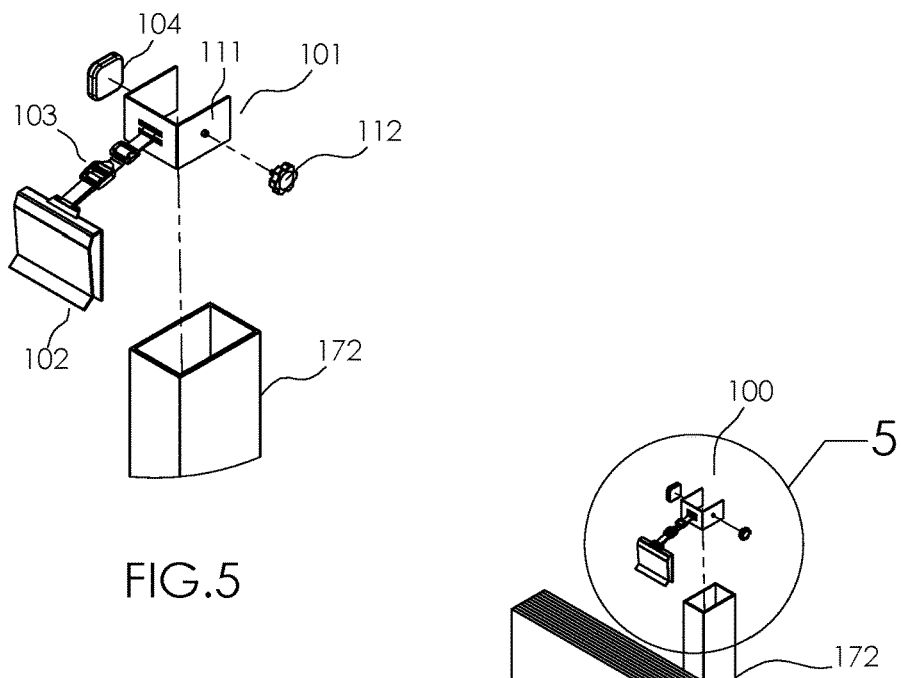
FIG. 5 a detail view of an embodiment of the disclosure.
Figure 4:
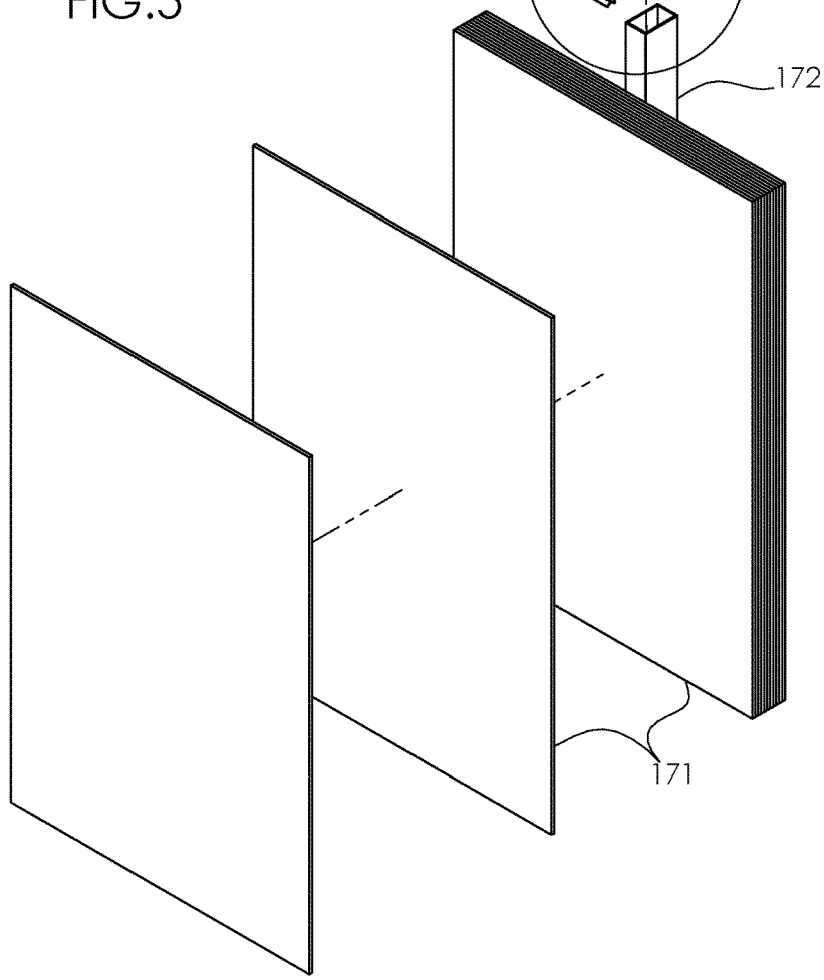
FIG. 4 an exploded view of an embodiment of the disclosure.
Figure 6:
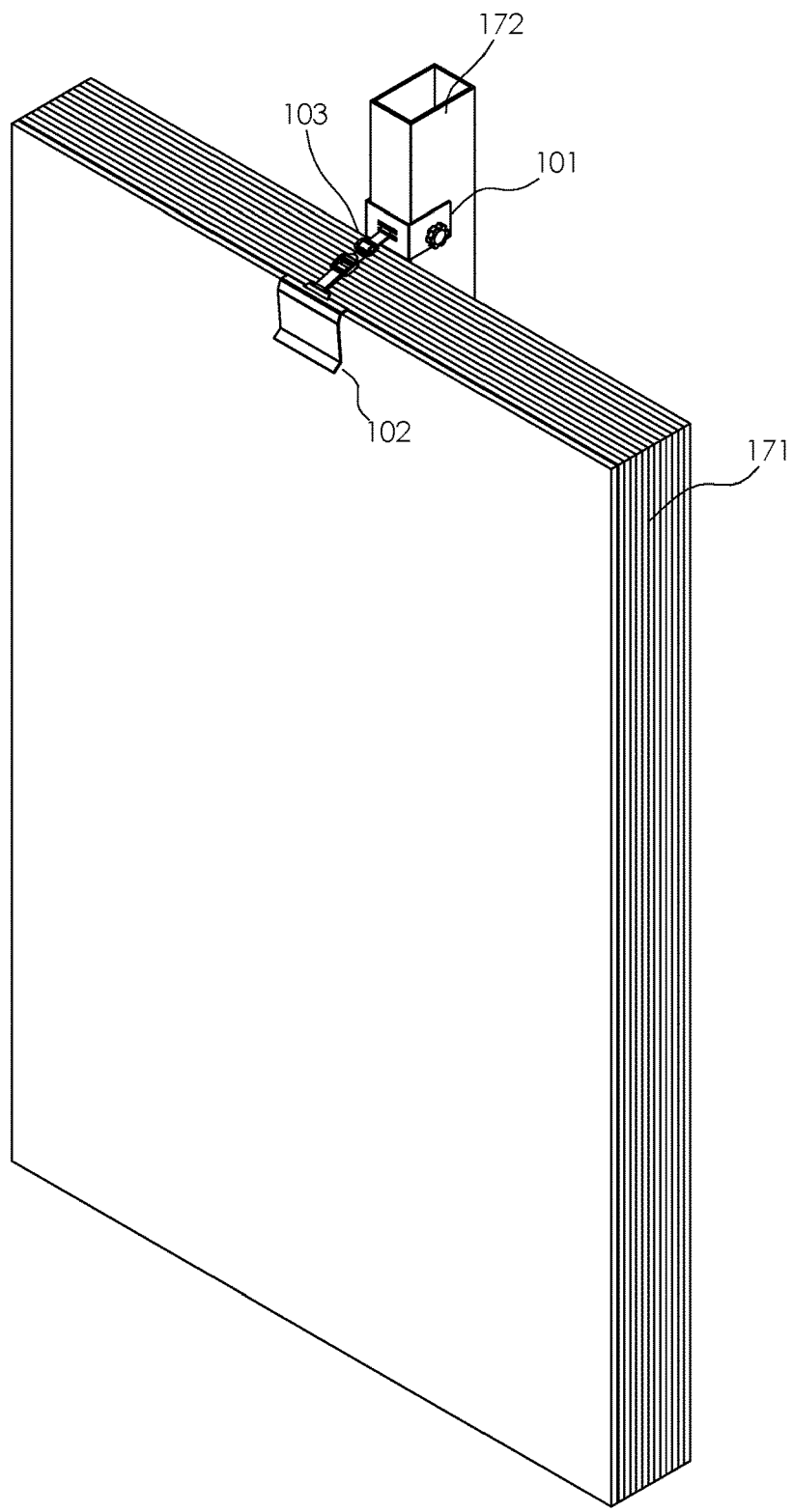
FIG. 6 an in-use view of an embodiment of the disclosure.

Detailed reference will now be made to one or more potential embodiments of the disclosure, which are illustrated in FIG. 1 through 6.

The retaining system for vertically stacked material 100 (hereinafter invention) is configured for use with a plurality of drywall sheets 171 that are awaiting installation. The invention 100 is a fastening device that secures the plurality of drywall sheets 171 to a stanchion 172 such that the plurality of drywall sheets 171 will not fall during storage. The invention 100 comprises a stanchion 172 clip 101, a drywall clip 102, a securing strap system 103, and a locating beacon 104. The stanchion 172 clip 101 attaches to the stanchion 172. The drywall clip 102 attaches to a drywall sheet selected from the plurality of drywall sheets 171. The securing strap system 103 attaches the drywall clip 102 to the stanchion 172 clip 101. The locating beacon 104 is a GPS based device that identifies the location of the invention 100 and the associated plurality of drywall sheets 171 on a job site.

The stanchion 172 clip 101 is a fastening device. The stanchion 172 clip 101 fastens to a stanchion 172. The stanchion 172 clip 101 forms an anchor point that transfers the load path of the plurality of drywall sheets 171 in such a manner that the plurality of drywall sheets 171 will not shift in a horizontal direction when the plurality of drywall sheets 171 are vertically stored. By attaching the plurality of drywall sheets 171 into the stanchion 172 in this manner, the plurality of drywall sheets 171 will not inadvertently fall over during storage. The stanchion 172 clip 101 comprises a first hyoid 111, a screw clamp 112, and a first anchor ring 113.

The first hyoid 111 is a hyoid structure. The span between the first arm of the first hyoid 111 and the second arm of the first hyoid 111 is greater than the span of the stanchion 172 such that the first hyoid 111 will fit around the stanchion 172.

The screw clamp 112 is a threaded shaft that screws through the first arm of the first hyoid 111 into the stanchion 172. The screw clamp 112 secures the first hyoid 111 to the stanchion 172.

The first anchor ring 113 is an anchor point which attaches the securing strap system 103 to the stanchion 172 clip 101. The first anchor ring 113 is formed from a structure selected from the group consisting of a bar and a ring.

The drywall clip 102 is a fastening device. The drywall clip 102 fastens to an end drywall sheet 173 of the plurality of drywall sheets 171. The end drywall sheet 173 is the drywall sheet selected from the plurality of drywall sheets 171 that is distal from the stanchion 172 associated with the stanchion 172 clip 101. The drywall clip 102 is a cantilever V spring. The end drywall sheet 173 inserts between the first arm and the second arm of the cantilever V spring formed by the drywall clip 102. The insertion of the end drywall sheet 173 into the drywall clip 102 deforms the drywall clip 102 such that the first arm and the second arm of the drywall clip 102 will clip on to the end drywall sheet 173 as the drywall clip 102 returns to its relaxed shape. The drywall clip 102 comprises a second hyoid 121 and a second anchor ring 122.

The second hyoid 121 is a hyoid structure. The span between the third arm of the second hyoid 121 and the fourth arm of the second hyoid 121 is slightly less than the span of the edge of the end drywall sheet 173. The second hyoid 121 is a cantilever V spring. The span of the second hyoid 121 is selected such that the insertion of the end drywall sheet 173 into the second hyoid 121 will displace the third arm of the second hyoid 121 and the fourth arm of the second hyoid 121 in such a manner that the second hyoid 121 applies a clamping force against the end drywall sheet 173.

The second anchor ring 122 is a ring that attaches to the second hyoid 121. The securing strap system 103 attaches to the second anchor ring 122.

The securing strap system 103 is a textile-based fastening system that attaches the stanchion 172 clip 101 to the drywall clip 102. The tension of the securing strap system 103 is adjustable such that the span of the invention 100 adjusts to accommodate variations in the number of drywall sheets contained within the plurality of drywall sheets 171. The securing strap system 103 comprises a base webbing 131, a ring and slider arrangement 133, and a seam 135.

The base webbing 131 is a commercially available textile webbing. The base webbing 131 is further defined with a first end 161, a second end 162, a first surface 163, and a second surface 164.

The ring and slider arrangement 133 is a mechanical device that adjusts the tension of the portion of the base webbing 131 that is between the stanchion 172 clip 101 and the drywall clip 102. The tension provided by the ring and slider arrangement 133 is adjustable. The use of a ring and slider arrangement 133 is well-known and documented in the textile arts. The ring and slider arrangement 133 further comprises a first anchor ring 113 and the first anchor ring 113.

The slider 134 is the element of the ring and slider arrangement 133 through which the base webbing 131 is twice inserted. The tension of the base webbing 131 is adjusted by adjusting the position of the slider 134 along the base webbing 131. The first anchor ring 113 is described elsewhere in this disclosure.

The seam 135 is a mechanism that attaches the first end 161 of the base webbing 131 to the first surface 163 of the base webbing 131. In the first potential embodiment of the disclosure, the seam 135 is a sewn seam.

The locating beacon 104 is a wireless electrical device that attaches to the stanchion 172 clip 101. The locating beacon 104 is a GPS based device. The locating beacon 104: 1) receives a query from an appropriate authority; 2) queries the GPS to determine the GPS coordinates of the invention 100; and, 3) transmits the GPS coordinates to the appropriate authority. The locating beacon 104 can be used to identify the location of all the pluralities of drywall sheets 171. The intended use of the locating beacon 104 is to allow an appropriate authority to rapidly identify the location of all the pluralities of drywall sheets 171 during a regulatory inspection. The locating beacon 104 comprises a logic module 141, a communication module 142, and a GPS module 143.

The logic module 141 is a readily and commercially available programmable electronic device that is used to manage, regulate, and operate the locating beacon 104. Depending on the specific design and the selected components, the logic module 141 can be a separate component within the locating beacon 104 or the functions of the logic module 141 can be incorporated into another component within the locating beacon 104.

The communication module 142 is a wireless electronic communication device that allows the logic module 141 to communicate with a locally presented device wirelessly. Specifically, the communication module 142 establishes a wireless communication link between the locating beacon 104 and the locally presented device. In the first potential embodiment of the disclosure, the communication module 142 supports a communication protocol selected from the group consisting of a WiFi protocol or a Bluetooth protocol.

The GPS module 143 is an electrical device that communicates with the GPS to determine the GPS coordinates of the GPS module 143. When queried by the logic module 141, the GPS module 143 transfers the GPS coordinates to the logic module 141.

This paragraph describes the assembly of the invention 100. The first end 161 of the base webbing 131 inserts through the second anchor ring 122 of the drywall clip 102. The seam 135 then attaches the first end 161 to the first surface 163 of the base webbing 131. The second end 162 of the base webbing 131 is threaded in the normal manner through the slider 134 of the ring and slider arrangement 133. The second end 162 then loops through the base webbing 131 through the first anchor ring 113 and is then rethreaded through slider 134 in the normal manner. The tension on the base webbing 131 is adjusted by adjusting the position of the slider 134 along the base webbing 131.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Appropriate Authority: As used in this disclosure, an appropriate authority is a previously determined person or organization that is designated to receive alarm or other notification messages regarding a monitored system or activity.

Bluetooth: As used in this disclosure, Bluetooth is a standardized communication protocol that is used to wirelessly interconnect electronic devices.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring.

Clip: As used in this disclosure, a clip is a fastener that attaches to an object by gripping or clasping the object.

Force of Gravity: As used in this disclosure, the force of gravity refers to a vector that indicates the direction of the pull of gravity on an object at or near the surface of the earth.

GPS: As used in this disclosure, and depending on the context, GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of the length of the first arm roughly equals the span of the length of the second arm. Hyoids generally have a U shaped appearance.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Ring: As used in this disclosure, a ring is a term that is used to describe a flat or plate-like structure through which an aperture is formed. Rings are often considered loops.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Stanchion: As used in this disclosure, a stanchion refers to a vertical pole, post, or support. Textile: As used in this disclosure, a textile is a material that is woven, knitted, braided or felted. Synonyms in common usage for this definition include fabric and cloth.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A drywall fastening apparatus comprising:
a stanchion clip, a drywall clip, a securing strap system, and a locating beacon;
wherein the securing strap system attaches the stanchion clip to the drywall clip;
wherein the locating beacon attaches to the stanchion clip;
wherein the drywall fastening apparatus is configured for use with a plurality of drywall sheets;
wherein the drywall fastening apparatus is configured for use with a stanchion;
wherein the stanchion clip forms an anchor point that transfers the load path of the plurality of drywall sheets in such a manner that the plurality of drywall sheets will not shift in a horizontal direction when the plurality of drywall sheets are vertically stored;
wherein the drywall clip secures the plurality of drywall sheets to the stanchion such that the plurality of drywall sheets will not fall when the plurality of drywall sheets are vertically stored;
wherein the stanchion clip attaches to the stanchion;
wherein the drywall clip attaches to a drywall sheet selected from the plurality of drywall sheets;
wherein the locating beacon identifies the location of the fastening device;
wherein the stanchion clip comprises a first hyoid, a screw clamp, and a first anchor ring;
wherein the drywall clip comprises a second hyoid and a second anchor ring;
wherein the screw clamp is a threaded shaft that screws through the first arm of the first hyoid into the stanchion;
wherein the screw clamp secures the first hyoid to the stanchion.

2. The drywall fastening apparatus according to claim 1 wherein the drywall clip fastens to an end drywall sheet of the plurality of drywall sheets;
wherein the end drywall sheet is the drywall sheet selected from the plurality of drywall sheets that is distal from the stanchion associated with the stanchion clip.

3. The drywall fastening apparatus according to claim 2 wherein the drywall clip is a cantilever V spring;
wherein the end drywall sheet inserts between the arms of the cantilever V spring formed by the drywall clip.

4. The drywall fastening apparatus according to claim 3 wherein the second hyoid is a hyoid structure;
wherein the span between the third arm of the second hyoid and the fourth arm of the second hyoid is slightly less than the span of the edge of the end drywall sheet;
wherein the second hyoid is a cantilever V spring;
wherein the span of the second hyoid is selected such that the insertion of the end drywall sheet into the second hyoid will displace the third arm of the second hyoid and the fourth arm of the second hyoid in such a manner that the second hyoid applies a clamping force against the end drywall sheet.

5. The drywall fastening apparatus according to claim 4 wherein the securing strap system is a textile-based fastening system;
wherein the tension of the securing strap system is adjustable such that the span of the drywall fastening apparatus adjusts to accommodate variations in the number of drywall sheets contained within the plurality of drywall sheets.

6. The drywall fastening apparatus according to claim 5 wherein the locating beacon is a wireless electrical device;
wherein the locating beacon is a GPS based device;
wherein the locating beacon: a) receives a query from an appropriate authority; b) queries the GPS to determine the GPS coordinates of the drywall fastening apparatus; and, c) transmits the GPS coordinates to the appropriate authority.

7. The drywall fastening apparatus according to claim 6 wherein the first screw clamp attaches to the first hyoid;
wherein the first anchor ring attaches to the first hyoid.

8. The drywall fastening apparatus according to claim 7 wherein the first hyoid is a hyoid structure;
wherein the span between the first arm of the first hyoid and the second arm of the first hyoid is greater than the span of the stanchion such that the first hyoid will fit around the stanchion.

9. The drywall fastening apparatus according to claim 8 wherein the first anchor ring attaches the securing strap system to the stanchion clip.

10. The drywall fastening apparatus according to claim 9, wherein the second anchor ring is a ring that attaches to the second hyoid;
wherein the securing strap system attaches to the second anchor ring.

11. The drywall fastening apparatus according to claim 10 wherein the securing strap system comprises a base webbing, a ring and slider arrangement, and a seam;
wherein the seam attaches the base webbing to itself;
wherein the base webbing inserts through the ring and slider arrangement.

12. The drywall fastening apparatus according to claim 11 wherein the base webbing is a textile webbing;
wherein the base webbing is further defined with a first end, a second end,
a first surface, and a second surface.

13. The drywall fastening apparatus according to claim 12 wherein the ring and slider arrangement is a mechanical device that adjusts the tension of the portion of the base webbing that is between the stanchion clip and the drywall clip;
wherein the tension provided by the ring and slider arrangement is adjustable;
wherein a slider is the element of the ring and slider arrangement through which the base webbing is twice inserted;
wherein a tension of the base webbing is adjusted by adjusting the position of the slider along the base webbing.

14. The drywall fastening apparatus according to claim 13 wherein the locating beacon comprises a logic module, a communication module, and a GPS module;
wherein the logic module, the communication module, and the GPS module are electrically interconnected.

15. The drywall fastening apparatus according to claim 14 wherein the logic module is a programmable electronic;
wherein the communication module is a wireless electronic communication device that allows the logic module to communicate with a locally presented device wirelessly;
wherein the communication module establishes a wireless communication link between the logic module and a locally presented device;
wherein the GPS module is an electrical device that communicates with the GPS to determine the GPS coordinates of the GPS module;
wherein when queried by the logic module, the GPS module transfers the GPS coordinates to the logic module.

16. The drywall fastening apparatus according to claim 15 wherein the seam is a sewn seam.

\* \* \* \* \*